(12) United States Patent
Ishizuka

(10) Patent No.: US 7,204,552 B2
(45) Date of Patent: Apr. 17, 2007

(54) DEVICE FOR PROTECTING CERVICAL SPINE OF SEAT OCCUPANT IN AUTOMOTIVE SEAT

(75) Inventor: Takanori Ishizuka, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/326,461

(22) Filed: Jan. 6, 2006

(65) Prior Publication Data

US 2006/0170258 A1 Aug. 3, 2006

(51) Int. Cl.
*B60N 2/42* (2006.01)
(52) U.S. Cl. ................................. 297/216.12
(58) Field of Classification Search ........... 297/216.12, 297/216.13, 408
See application file for complete search history.

(56) References Cited

U.S. PATENT DOCUMENTS

| | | | | |
|---|---|---|---|---|
| 5,927,804 A | * | 7/1999 | Cuevas | 297/216.12 |
| 6,250,714 B1 | * | 6/2001 | Nakano et al. | 297/216.12 |
| 6,375,262 B1 | * | 4/2002 | Watanabe | 297/284.4 |
| 6,702,377 B2 | * | 3/2004 | Nakano | 297/216.12 |
| 6,783,177 B1 | * | 8/2004 | Nakano | 297/216.12 |
| 6,789,846 B2 | * | 9/2004 | Humer et al. | 297/216.12 |
| 6,871,913 B2 | * | 3/2005 | Malsch et al. | 297/410 |

FOREIGN PATENT DOCUMENTS

JP 2001-58530 3/2001

* cited by examiner

*Primary Examiner*—Peter R. Brown
(74) *Attorney, Agent, or Firm*—Browdy and Neimark, PLLC

(57) ABSTRACT

A device for protecting a cervical spine of seat occupant in seat back, wherein a lever element is movably provided and connected with a headrest stay element at one end thereof. The lever element has another end disposed at a return spring element. A pressure receiver element of soft and elastic property is provided, which includes a first engagement portion and second engagement portion. The foregoing one and another ends of the lever element are engaged in those first and second engagement portions, respectively, so that the lever element and return spring element are connected together via the pressure receiver element so as to be free of contact with each other.

7 Claims, 4 Drawing Sheets

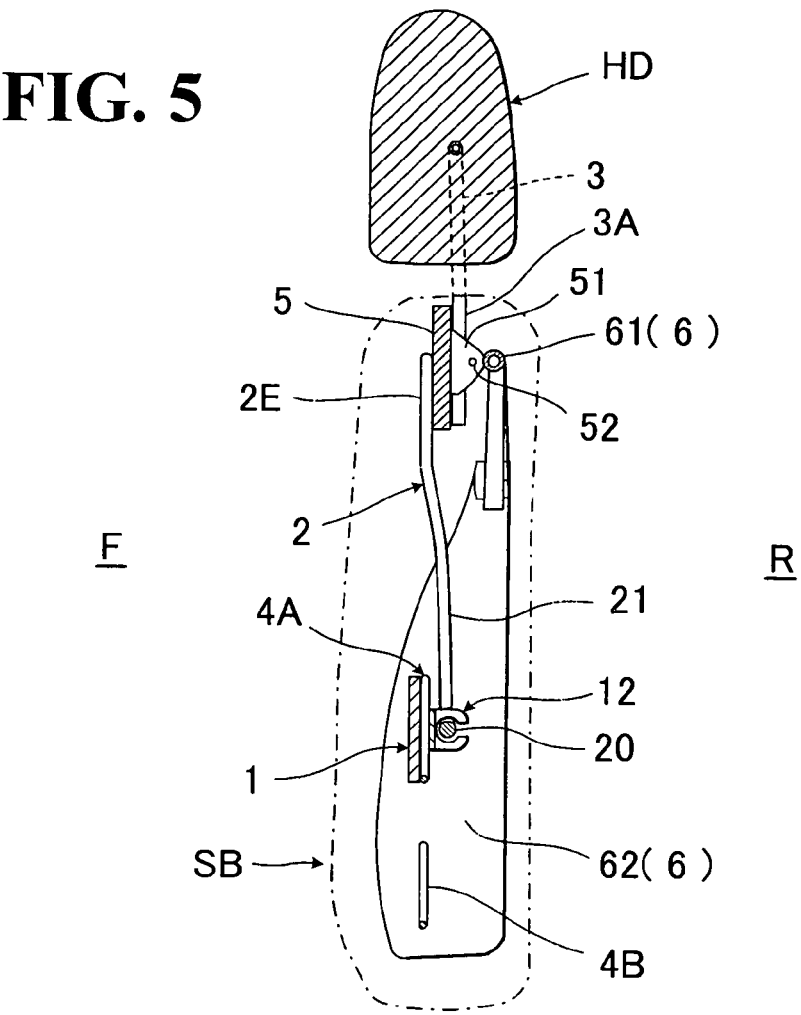
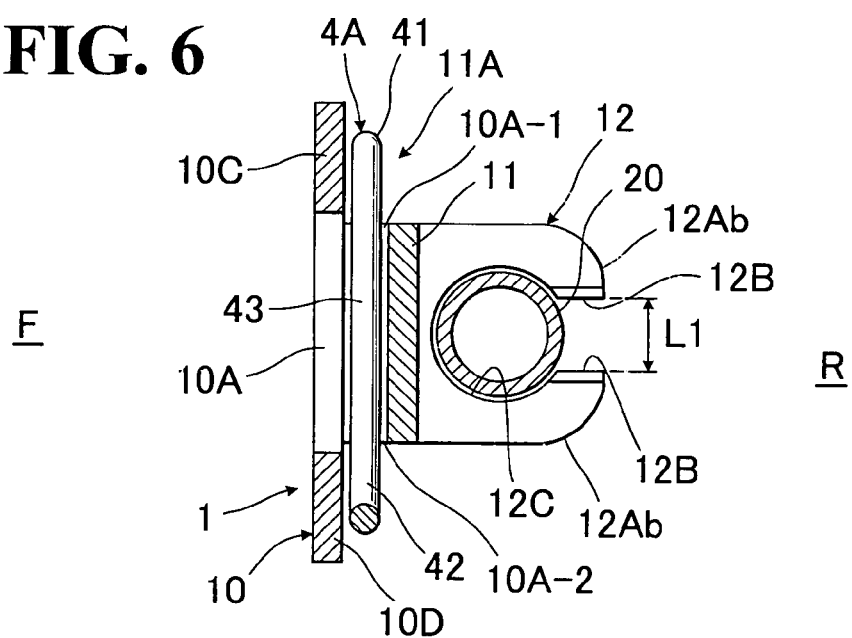

DEVICE FOR PROTECTING CERVICAL SPINE OF SEAT OCCUPANT IN AUTOMOTIVE SEAT

FIELD OF THE INVENTION

The present invention relates to a device for protecting a cervical spine of a seat occupant in an automotive seat of a type having an active headrest device.

DESCRIPTION OF PRIOR ART

There has been known a device for protecting a cervical spine of a seat occupant in combination with an active headrest device (i.e. a headrest device in which a headrest body is automatically moved in conjunction with other mechanical parts), which is provided in an automotive seat and designed to protect a cervical spine of an occupant sitting on the seat in the case of rear-end collision or backward collision.

As seen in FIG. 1, according to this kind of cervical spine protection device, a headrest stay element (S), fixed to a headrest body (HD) for receiving a head (H) of a seat occupant (M), is rotatably connected with a lever member (L) via a pin (R) in the seat back (SB), and the lever member (L) extends donwardly in the seat back (SB). As shown, the lower end of that lever member (L) is fixed to a plate member (P) disposed at a given point of the seat back (SB) which supports the back of seat occupant (M). Hence, the headrest body (HD) and plate member (P) are rotatable about pin (R) in forward and backward directions.

In the case of a rear-end collision occurred to a vehicle (not shown) having the foregoing active headrest arrangement, let us first describe a dynamical phenomenon: a great load (F1) is applied to the seat back (SB) in a direction forwardly of the seat (at F), as a result of which, a head (H) of seat occupant (M) is immediately displaced forwardly as indicated by the dotted lines, while at the same time, a recoil force (F2) caused from the body portion (B) of the occupant (M) is extend upon the seat back (SB) in a direction backwardly of the seat (at R). At this moment, the plate member (P) is pressed by that backward recoil force (F2) from the back of seat occupant (M) and displaced backwardly as indicated by arrow ②, which in turn causes the headrest body (HD) to rotate forwardly as indicated by arrow ①, thereby quickly bringing the headrest body (HD) to supportive contact with the seat occupant's head (H). In that way, the cervical spine of seat occupant (M) is protected against damage.

According to this conventional arrangement, the lever member (L) is of generally "inverted U" shape by bending a tubular metallic material into that "inverted U" shape, so that a horizontal lower end portion (at L1) is defined therein and also a pair of vertical portions (at L2) extending upwardly from the horizontal lower end portion. This is similar to an "inverted U" shape of lever member (2) of the present invention as shown in FIG. 2. As shown in FIG. 1, the two vertical portions (at L2) of the lever member (L) is pivotally connected via the pin (R) with the seat back frame (BF). While not shown in FIG. 1, but as understandable from FIG. 2, a sinuous return spring of metallic material is extended between two lateral sides of the seat back frame (BF) and the afore-said horizontal lower end portion (at L1) of leer member (L) is directly connected with the sinuous return spring.

But, such direct connection of the lever member lower end portion (at L1) with the return spring is found defective in that (i) since that particular lever end portion (at L1) is also connected with the plate member (P), when a recoil force (F2) is applied to the plate member (P) as stated above, a keen contact is caused between the lever lower end portion (at L1) and the return spring, which generates an unpleasant noise therefrom due to their metallic hardness, and (ii) it is uneasy to locate the lower end portion (at L1) to a predetermined point of the return spring and also it is troublesome to connect the former with the latter in practical assembly.

SUMMARY OF THE INVENTION

In view of the above-stated drawbacks, it is a purpose of the present invention to provide an improved device for protecting a cervical spine of seat occupant in automotive seat, which can be easily assembled and also prevents emission of unpleasant noise therefrom in operation.

In order to achieve such purpose, in accordance with the present invention, there is provided a device for protecting a cervical spine of a seat occupant, which basically comprises:

a headrest stay element connected to a headrest, the headrest stay element being movable in a direction forwardly and backwardly of a seat back;

a lever element having one end portion connected with the headrest stay element and another end portion opposite to the one end portion, the lever element being disposed in the seat back and movable in the direction forwardly and backwardly of the seat back together with the headrest stay element;

a return spring element resiliently extended in the seat back; and a pressure receiver element for receiving a pressure applied from a seat occupant in case of a back-end or backward collisions, the pressure receiver element having an elastic property and including:

a first engagement portion for receiving and engaging the afore-said another end portion of the lever element; and a second engagement portion for receiving and engaging a part of the return spring element, wherein the afore-said another end portion of the lever element is engaged in the first engagement portion, while the afore-said part of the return spring element is engaged in the second engagement portion, so that the lever element and the return spring element are connected together via the pressure receiver element so as to be free of contact with each other.

Preferably, the pressure receiver element may be formed from a synthetic resin material having a relatively soft and elastic property.

As one aspect of the present invention, the return spring element may comprise a sinuous return spring having a plurality of first curved spring portions facing in one direction and a plurality of second curved spring portions facing in another direction opposite to the one direction, in such a manner that one of the plurality of first curved spring portions alternates with one of the plurality of second curved portions. In that mode, the afore-said part of the return spring element may be a particular one of the plurality of first curved spring portions, and the second engagement portion may include a hole means, so that such particular one of the plurality of first curved spring portions may be frictionally inserted in the hole means, thereby connecting the sinuous return spring with the pressure receiver element.

Other various features and advantages of the present invention will become apparent from reading of the description hereinafter, with reference to the annexed drawings.

BRIEF DESCRIPTION OF THE DRAWINGS

FIG. 5 is a sectional view taken along the line V—V in the FIG. 2; and

FIG. 6 is a sectional view taken along the line VI—VI in the FIG. 4.

DETAILED DESCRIPTION OF PREFERRED EMBODIMENT OF THE INVENTION

Figure 1:
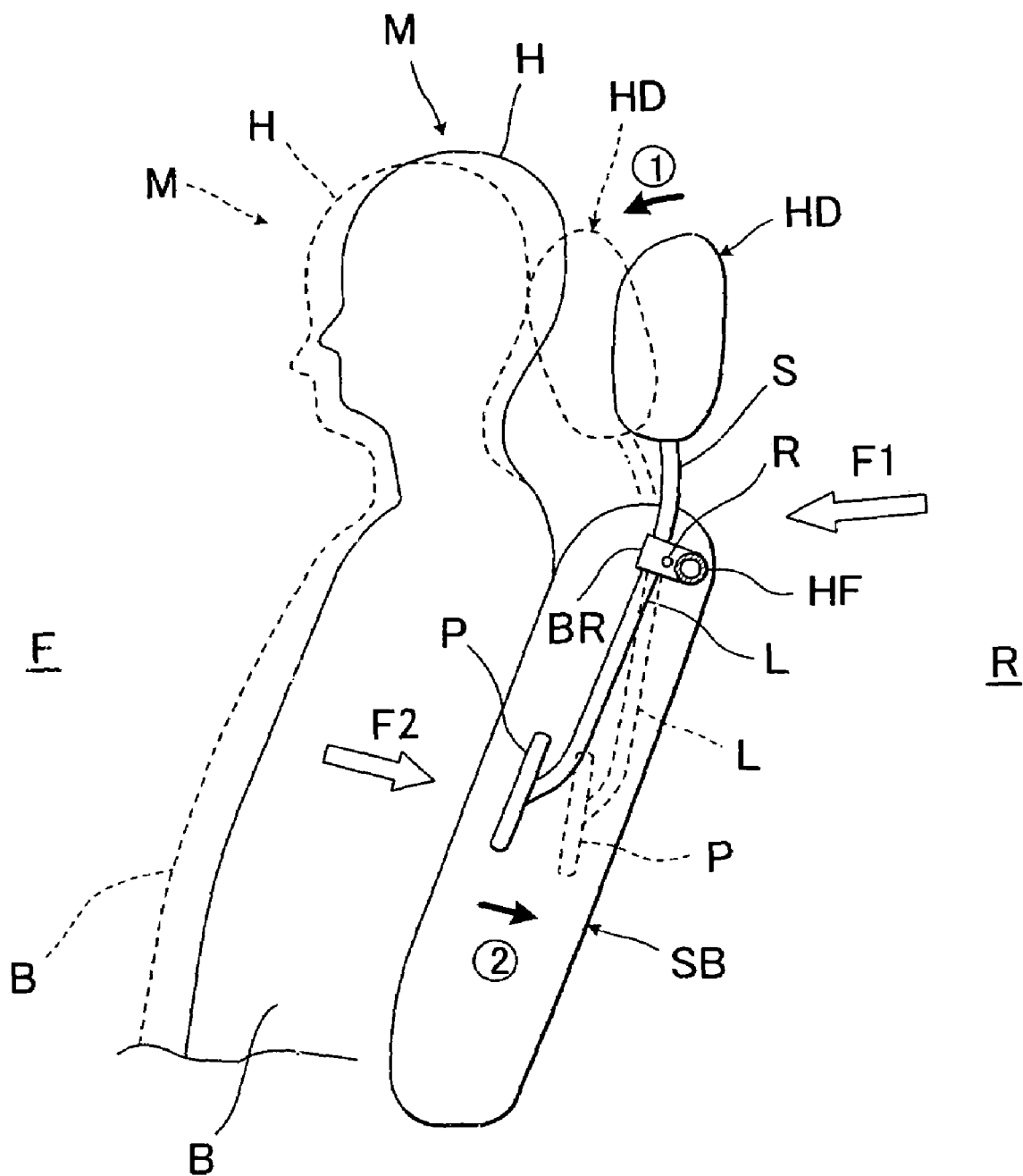
FIG. 1 is a diagram for explanatorily illustrating the structure and actions of a conventional device for protecting a cervical spine of seat occupant in automotive seat.

Referring to FIGS. 1 to 6, there is illustrated a preferred embodiment of a device for protecting a cervical spine of a seat occupant in an automotive seat, as generally designated by (PD), in accordance with the present invention.

Designation (6) represents a seat back frame provided within a seat back (see the designation (SB) in FIG. 5) of automotive seat (not shown). This seat back frame (6) is basically formed by an upper frame member (61), a lower frame member (63) and a pair of lateral frame members (62) (62), as known in the art.

It is noted that the term, "forward" or "forwardly," refers to a forward side (F) of the seat back (SB), whereas the term, "backward" or "backwardly," refers to a backward side (R) of the seat back (SB).

As shown, an active headrest (HD) is movably provided upon the top of the seat back (SB) via a pair of headrest stays (3A) (3A). Specifically, the headrest (HD) has a headrest frame (3) from which those two headrest stays (3A) extend downwardly into the inside of the seat back (B), and the two lower portions respectively of the two headrest stays (3A) are fixed to a backward surface of the rotary support plate (5) which forms one element of the cervical spine protection device (PD).

As can be seen from FIG. 5, the afore-said rotary support plate (5) is firmly connected to a bracket (51) which is rotatably connected via a hinge (52) with the upper frame member (61), wherein the bracket (51) and hinge (52) are constituent elements of the cervical spine protection device (PD).

It is noted here that the headrest (HD) and the rotary support plate (5) also constitutes the so-called active headrest device in combination with the undermentioned lever member (2), as known in the art.

The lever member (2) is of generally "U" shape and formed by a rigid metallic material so as to have, defined therein, a lower horizontal portion (20) and a pair of vertical portions (21) (21). This lever member (2) itself is known, but also one of constituent elements of the cervical spine protection device (PD).

As shown, in this lever member (2), the afore-said pair of vertical portions (21) (21) each has an upper end portion (2E) which is fixed as by welding to the forward surface of the rotary support plate (5). Hence, such two vertical portions (21) extend downwardly from the rotary support plate (5), so that the lower horizontal portion (20) of the lever member (2) is positioned at a predetermined point.

A known sinuous return spring (4A) is extended between the two lateral frame members (62) (62) and arranged such that a part thereof is disposed at a point corresponding to the foregoing predetermined point where the lower horizontal portion (20) is located as stated above.

Designation (4B) denotes an ordinary sinuous spring for resiliently supporting a lower body portion of a seat occupant.

In accordance with the present invention, there is provided a pressure receiver plate element (1) at a point corresponding to the above-stated predetermined point where the part of the sinuous return spring (4A) overlaps with the lever member lower horizontal portion (20).

Figure 4:
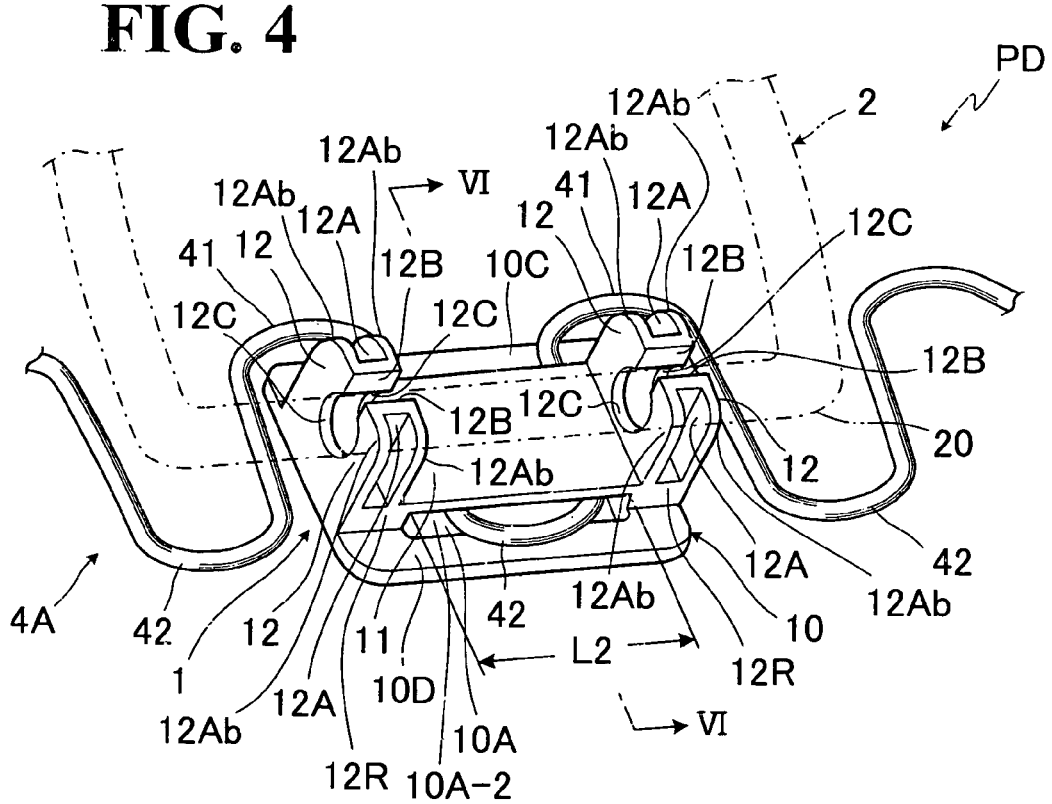
FIG. 4 is a partly broken perspective showing a principal part of the device for protecting a cervical spine of seat occupant in the present invention.

The pressure receiver plate element (1) is formed from a synthetic resin material such as polypropylene into the illustrated configuration. Specifically, as best shown in FIG. 4, the pressure receiver plate element (1) is basically formed by the following constituent integral elements in monolithic manner: a first flat body portion (10); a second flat body portion (11); a pair of first engagement portions (12) (12) for receiving and securely engaging the horizontal portion (20) of the lever member (2); and a second engagement portion (10A) in which a part of the sinuous return spring (4A) may be securely engaged.

Figure 2:
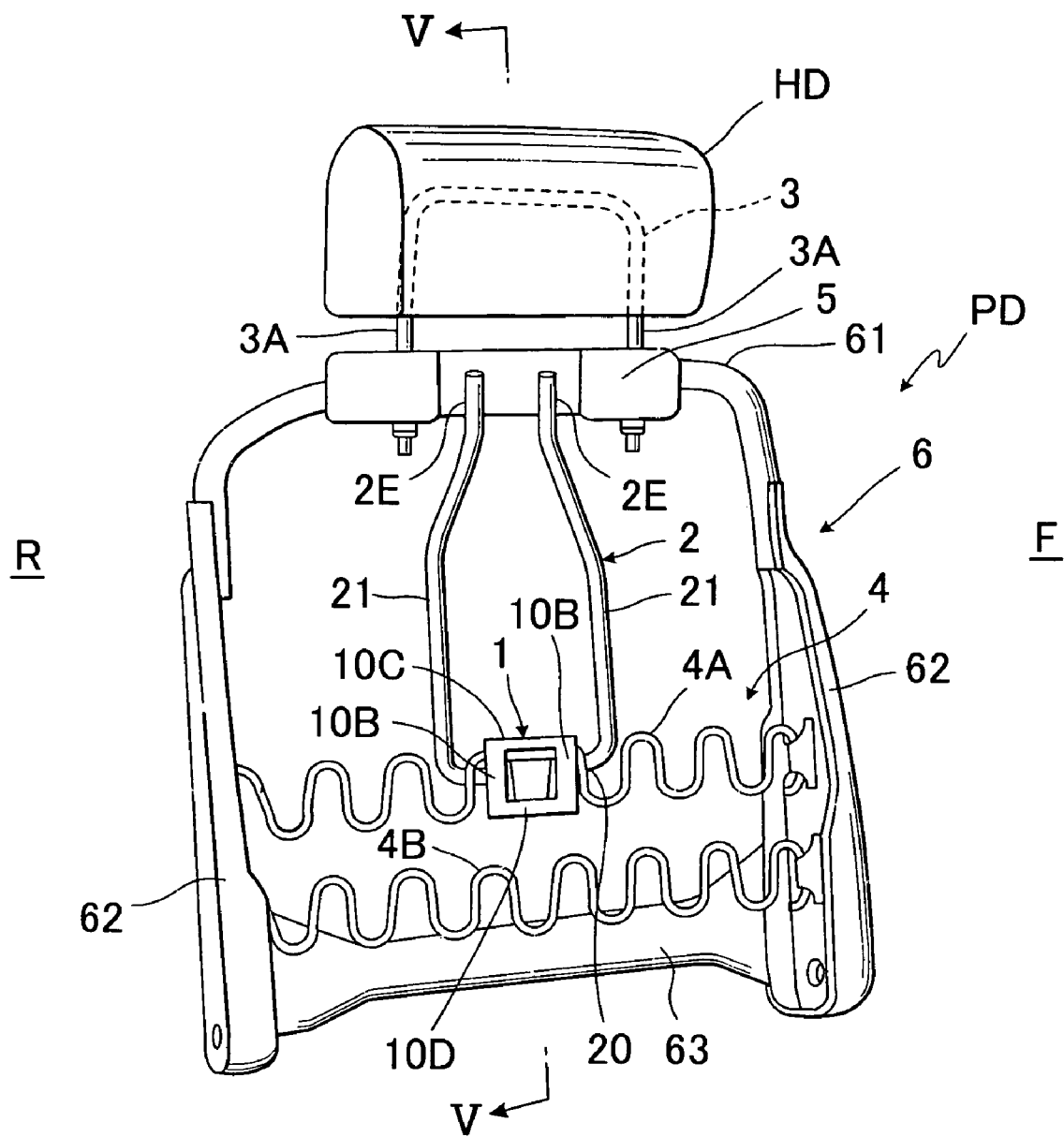
FIG. 2 is a schematic perspective view showing a device for protecting a cervical spine of seat occupant in accordance with the present invention, which is provided in a seat back frame.

The first flat body portion (10) is so formed as to surround the securing hole (10A), which forms a portion to which a load is directly applied from a body portion of seat occupant and thus functions to directly receive a pressure therefrom. As best seen in FIG. 2, the first flat body portion (10) includes a cross plate region (10C), a second cross plate region (10D), and a pair of lateral vertical plate regions (10B) (10B) defined between the first and second cross plate regions (10C) (10D). As seen in FIG. 4 in conjunction with FIG. 2, defined respectively in those two lateral vertical plate regions (10B) are the aforementioned two first engagement portions (12) which will be described below.

Namely, each of the two first engagement portions (12) is formed integrally with the lateral region (10B) so as to project from one side of that particular lateral region (10B). As shown in FIG. 4, each first engagement portion (12) is basically of a dual wall structure and comprises: a pair of engagement lugs (12A) (12A) each being formed by a pair of spaced-apart upstanding wall portions (12Ab) (12Ab) and a cross wall portion (12B); and a pair of circular engagement zones each being defined by a pair of circular engagement edges (12C) (12C).

As seen in FIG. 6, the two cross wall portions (12B) respectively of the above-described two engagement lugs (12A) are spaced apart a distance (L1) from each other in a mutually facing relation. It is noted that such distance (L1) is smaller than a diameter of the circular engagement edges (12C).

Formed integrally with a base area of the two retaining arms (12A) (which is opposite to the cross wall portions (12B)) are a pair of raised regions (12R) (12R) by which the first and second plate portions (10) (11) are spaced apart from each other to define the afore-said second engagement portion (10A) therebetween.

Referring to the FIGS. 4 and 6 in combination, it is seen that such second engagement portion (10A) is a space which also defines a first through-hole (10A-1) between one end of the second plate portion (11) and the first cross plate region (10C) and further defines a second through-hole (10A-2) between another end of the second plate portion (11) and the second cross plate region (10D).

The second engagement portion (10A), inclusive of the first and second through-holes (10A-1) (10A-2), has a width (L2) as indicated in FIG. 4. Strictly stated, such width (L2) is a width between the two inner walls respectively of the two raised regions (12R).

Figure 3:
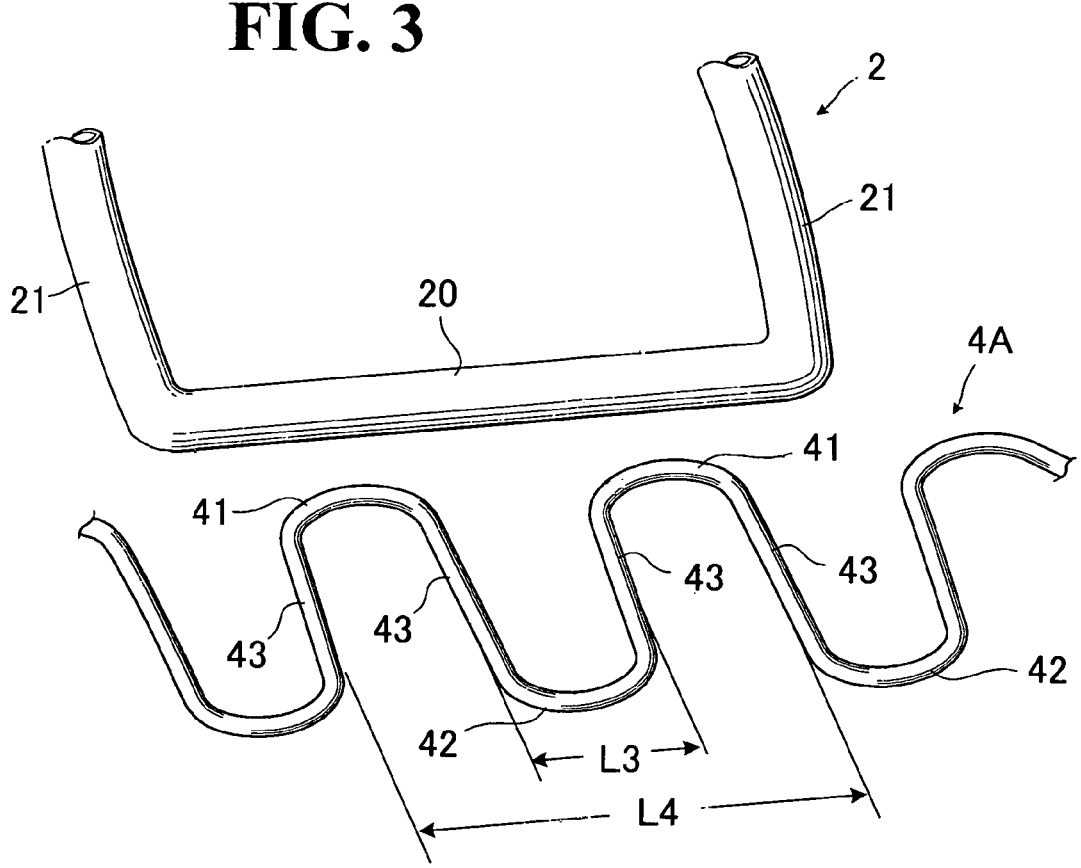
FIG. 3 is a partly broken perspective view showing a lever member and a sinuous return spring which are used in the device for protecting a cervical spine of seat occupant in the present invention.

Referring to FIG. 3, the sinuous return spring (4A) is shown as having a plurality of first curved spring portions (41) projecting in one direction and a plurality of second curved spring portions (42) projecting in another direction opposite to that one direction, such that one of the first curved spring portions (41) alternates with one of the second curved spring portions (42), as illustrated. As far as the shown embodiment is concerned, with the sinuous return spring (4A) attached horizontally to the seat back frame (6), it actually follows that all the second curved spring portions (42) face to a side downwardly of the seat back frame (6) or the seat back (SB), whereas all the first curved spring portions (41) face to a side upwardly of the seat back frame (6) or the seat back (SB).

As seen in the FIG. 3 a generally rectilinear transit region (43) is naturally defined between each first curved spring portion (41) and each second curved spring portion (42). It is noted that one generally rectilinear transit region (43) is spaced apart a distance (L3) from another generally rectilinear transit region (43). Otherwise stated, each second curved spring portion (42) is of a width (L3).

In accordance with the present invention, the width (L2) of the afore-said second engagement portion (10A) is slightly smaller than the width (L3) of the second curved spring portion (42), so that, as will be described later, one of the second curved spring portions (42) may be frictionally inserted and resiliently retained in the second engagement portion (10A) associated with the pressure receiver plate (1).

As previously described, the width (L2) is defined between the two inner walls respectively of the two raised regions (12R) (12R) and thus extends horizontally along the longitudinal direction of the pressure receiver plate (1). In addition to such width (L2), each of the first and second through-holes (10A-1) (10A-2) naturally has another width extending in a direction orthogonal with the direction of that width (L2), which is not designated in the drawings, but can readily be understood by looking at FIG. 6 in conjunction with FIG. 4. This is because such another width is needed for retaining the afore-said one particular second curved spring portion (42) in a direction orthogonal with the direction in which the two inner walls respectively of the two raised regions (12R), as defined by the width (L2), retain both lateral sides (i.e. the two transit regions (43)) of that one particular second curved spring portion (42). Any person skilled in the art will understand from the FIG. 6 that such another width is equally defined at the following two points: a point between one edge of the second flat body portion (11) and the first cross plate region (10C); and a point between another edge of the second flat body portion (11) and the second cross plate region (10D). In the present invention, this another width is equal to or slightly smaller than a cross-section (or diameter) of the afore-said one particular second U-shaped spring portion (42), so that the afore-said one particular second curved spring portion (42) and both two associated transit regions (43) are frictionally sandwiched between and retained by the second flat body portion (11) and the first and second cross plate regions (10C) (10D).

Further, in accordance with the invention, as understandable form the FIGS. 3 and 4 in combination, the pressure receiver plate (1) per se is of a width smaller than a width (L4) defined between two first curved spring portions (41) which are disposed on the opposite sides of and adjoined with a particular one second curved spring portion (42) that is to be inserted in the above-described second engagement portion (10A). Hence, a pair of another generally rectilinear transit regions (43') (43'), disposed symmetrically relative to and on the opposite sides of a pair of the said generally rectilinear transit regions (43), is free of contact with the two lateral ends of the pressure receiver plate (1).

Now, a description will be made of how the lever member (2) and sinuous return spring (4A) are connected together by the above-described pressure receiver plate (1).

At first, the pressure receiver plate (1) is brought to a particular one of the second curved spring portions (42) of sinuous return spring (4A), wherein that particular one second curved spring portion (42) is disposed at a point substantially corresponding to a center of the lower horizontal portion (20) of the lever member (2), as seen in FIG. 3.

Then, as understandable from FIGS. 4 and 6, such one particular second curved spring portion (42) is first inserted into the first through-hole (10A-1) of the pressure receiver plate (1) and passed through the second engagement portion (10A) until a distal end part of the second curved spring portion (42) projects outwardly through the second through-hole (10A-2) and is disposed on the second cross plate region (10D). Hence, both two generally rectilinear transit regions (43) (43) adjoined with this one particular second curved spring portion (42) are in a frictional contact with the respective two inner walls respectively of the two raised regions (12R) (12R). Further, the second curved spring portion (42) and both two associated transit regions (43) are frictionally sandwiched between and retained by the second flat body portion (11) and the first and second cross plate regions (10C) (10D).

Thereafter, the lower horizontal portion (20) of the lever member (2) is brought to the two first engagement portions (12) of the pressure receiver plate (1) and forcibly inserted into a narrow space (at L1) between the two cross wall portions (12B) of the latter (12). Then, both two engagement lugs (12A) of each securing portion (12), by the reason of their elastic property, are resiliently deformed and displaced from each other, thereby allowing the lever member lower horizontal portion (20) to pass therethrough and be placed in the circular zone defined by the two circular engagement edges (12C). At this moment, both two engagement lugs (12A) are automatically moved back to their normal home potions due to their resilient recovery property. It is noted here that such elastic movability of the two engagement lugs (12A) is enhanced and assured by the provision of two spaced-apart upstanding wall portions (12Ab) (12Ab) in each of those particular two engagement lugs (12A).

As a result thereof, the two cross wall portions (12B) are returned to their respective home positions and thus provides the narrow space (at L1) therebetween, whereby, as shown in FIG. 6, the lever lower horizontal portion (20) is closely contacted with and embracingly retained by the circular engagement edges (12C) of the two first engagement portions (12) against removal therefrom.

Accordingly, the lever member (2) is connected with the sinuous return spring (4A) by the pressure receiver plate (1), so that the cervical spine protection device (PD) is assembled in the seat back frame (16).

It should be understood here that a seat occupant (M) in FIG. 1 and the same actions of the conventional cervical spine protection device described previous are applied to the cervical spine protection device (PD) of the present invention, although not shown in FIGS. 2 to 6.

In the present invention, it is important to note that the first engagement portion (12) should be spaced apart from the second engagement portion (10A) a distance sufficient to insure that an exposed portion of the lever element (2), which is not engaged in the first engagement portion (12), is free of contact with an exposed portion of the sinuous return spring (4A) which is not engaged in the second engagement portion (10A), even when the return spring (4A) is resiliently warped with backward displacement of both pressure receive plate (1) and lever member (2) due to a recoil force (see F2 in FIG. 1) caused by a backward collision case or the like. In other word, a thickness of the two raised regions (12R) (12R) and a position of the circular engagement edges (12C) should be set to a degree enough to maintain the foregoing contactless relation between the lever member (2) and the return spring (4A).

As constructed above, it is appreciated that the following effects and advantages are attained in accordance with the present invention:

(i) It is quite easy to securely engage the pressure receiver plate (1) with both lever member (2) and sinuous return spring (4A), because, at first, a particular one of the second curved spring portions (42) of the sinuous return spring (4A) may be simply inserted into the second engagement portion (10A), and then, the lower horizontal portion (20) of the lever member (2) be simply inserted into the two first engagement portions (12). Assuredly, those first and second engagement portions (12) (10A) act to resiliently and embracingly retain the respective lever member lower horizontal portion (20) and one particular second curved spring portion (42). This effectively expedites assembly of the cervical spine protection device (PD)

(ii) The two first engagement portions (12) are definitely spaced apart from the second engagement portion (10A) as stated above, which insures to keep the lever member (2) out of contact with the sinuous return spring (4A), thus completely avoiding creation of any noise due to such contact.

(iii) The pressure receiver plate (i) per se is formed from such soft and elastic material as a synthetic resin material. Thus, no objectionable noise is emitted from contact between that pressure receiver plate (1) and both metallic lever member (2) and return spring (4A).

(iv) In addition to being formed from that synthetic resin material, the pressure receiver plate (1) is of a structure that provides a very limited small contact with each of the lever member (2) and sinuous return spring (4A). Namely, the lower horizontal portion (20) of lever member (2) is only contacted with the thin circular engagement edges (12C) of the first engagement portion (12) of pressure receiver plate (1). On the other hand, the afore-said one particular second curved spring portion (42) is, only at its curved head portion, contacted with the second plate region (10D) of the pressure receiver plate (1), as seen in FIG. 4, while each generally rectilinear transit region (43) extending from that second curved spring portion (42) is, only at its one side, contacted with the second plate region (11) of pressure receiver plate (1). Such structure extremely reduces creation of noise from contact between the pressure receiver plate (1) and the lever member (2) and sinuous return spring (4A).

(v) Due to the two first engagement portions (12) being frictionally engaged about the lower horizontal portion (20) of lever member (2), the pressure receiver plate (1) per se is free to rotate about that lever lower horizontal portion (20). Thus, the pressure receiver plate (1) is adjustingly inclinable so as to receive the contour of seat occupant's back at an optimum angle of inclination, so that the seat occupant does not feel any objectionable touch of the pressure receiver plate (1).

While having described the present invention so far, it should be understood that the invention is not limited to the illustrated embodiment, but any other modification, replacement, and addition may be applied thereto without departing from the scopes of the appended claims.

What is claimed is:

1. In combination with a seat back of automotive seat and a headrest movably provided on said seat back, a device for protecting a cervical spine of a seat occupant comprising:

A headrest stay element connected to said headrest, said headrest stay element being movable in a direction forwardly and backwardly of said seat back;

A lever element having a first end portion connected with said headrest stay element and a second end portion having an outer annular cross section, said lever element being disposed in said seat back and movable in the direction forwardly and backwardly of the seat back together with the headrest stay element;

a sinuous return spring element resiliently extended in said seat back, said sinuous return spring element having a width to provide a plane for supporting a back portion of said seat occupant; and an elastic pressure receiver element adapted to receive a pressure applied from a seat occupant in case of a rear-end or backward collision, said elastic pressure receiver element comprising:

a cross plate region; and a first engagement portion having an annular inner cross section rotatably engaged to said annular outer cross section of second end portion of said lever element; and a second engagement portion engaged to a part of said sinuous return spring element;

wherein both said part of said sinuous return spring element and said pressure receiver element rotate together around said second end portion of said lever element when a pressure is applied from the seat occupant during a rear-end or backward collision.

2. The device for protecting a cervical spine of a seat occupant as claimed in claim 1, wherein said pressure receiver element is formed from a synthetic resin material having a relatively soft and elastic property.

3. The device for protecting a cervical spine of a seat occupant as claimed in claim 1, wherein said return spring element has a plurality of first curved spring portions projecting in one direction and a plurality of second curved spring portions projecting in another direction opposite to said one direction, in such a manner that one of said plurality of first curved spring portions alternates with one of said plurality of second curved portions, wherein said part of said return spring element is a particular one of said plurality of first curved spring portions, wherein said second engagement portion includes a hole means, and wherein said particular one of said plurality of first curved spring portions is frictionally inserted in said hole means, thereby connecting said sinuous return spring element with said pressure receiver element.

4. The device for protecting a cervical spine of a seat occupant as claimed in claim 1, wherein said return spring element has a plurality of first curved spring portions projecting in one direction and a plurality of second curved spring portions projecting in another direction opposite to said one direction, in such a manner that one of said plurality of first curved spring portions alternates with one of said plurality of second curved portions, wherein said part of said return spring element is a particular one of said plurality of first curved spring portions, wherein said second engagement portion includes a hole means, wherein said particular one of said plurality of first curved spring portions is frictionally inserted in said hole means, thereby connecting said sinuous return spring with said pressure received element, and wherein said pressure plate element is of a width smaller than a width between a pair of said second curved spring portions adjoined with said particular one of said first curved spring portions, so that both two lateral sides of said pressure plate element are free of contact with said pair of said second curved spring portions.

5. The device for protecting a cervical spine of a seat occupant as claimed in claim 1, wherein said first engagement portion is so formed to include: a narrow space smaller than the annular outer cross-section of said end portion of said lever element in communication with said annular inner cross-section of said first engagement portion.

6. The device for protecting a cervical spine of a seat occupant as claimed in claim 1, wherein said second engagement portion is located between said cross plate region and said first engagement portion.

7. The device for protecting a cervical spine of a seat occupant as claimed in claim 1, wherein a width of said pressure receiver element is greater than that of said part of said sinuous return spring element engaged in said second engagement portion.

* * * * *